(12) United States Patent
Narayanachar

(10) Patent No.: US 8,078,202 B1
(45) Date of Patent: Dec. 13, 2011

(54) WIRELESS HANDSET CONFIGURED TO FORWARD MULTIPLE MESSAGES

(75) Inventor: Nagesh Narayanachar, Bangalore (IN)

(73) Assignee: Kyocera Corporation, Kyoto (JP)

( * ) Notice: Subject to any disclaimer, the term of this patent is extended or adjusted under 35 U.S.C. 154(b) by 697 days.

(21) Appl. No.: 11/672,904

(22) Filed: Feb. 8, 2007

(51) Int. Cl.
   *H04W 4/00* (2009.01)
(52) U.S. Cl. .................. 455/466; 455/412.1; 370/428
(58) Field of Classification Search .......... 455/466, 455/418–420, 412.1–413, 4.7, 567, 412.1, 455/414.1; 370/428–429
See application file for complete search history.

(56) References Cited

U.S. PATENT DOCUMENTS

| | | | | |
|---|---|---|---|---|
| 6,327,475 B1* | 12/2001 | Fujimori et al. | ........... | 455/458 |
| 6,715,003 B1* | 3/2004 | Safai | ........... | 710/33 |
| 6,721,574 B1* | 4/2004 | Jang | ........... | 455/466 |
| 7,015,817 B2* | 3/2006 | Copley et al. | ........... | 340/573.4 |
| 7,020,479 B2* | 3/2006 | Martschitsch | ........... | 455/466 |
| 7,734,476 B2* | 6/2010 | Wildman et al. | ........... | 705/2 |
| 2002/0128025 A1* | 9/2002 | Sin | ........... | 455/466 |
| 2002/0137530 A1* | 9/2002 | Karve | ........... | 455/466 |
| 2003/0052769 A1* | 3/2003 | Helferich | ........... | 340/7.21 |
| 2004/0219925 A1* | 11/2004 | Ahya et al. | ........... | 455/450 |
| 2005/0164721 A1 | 7/2005 | Eric Yeh et al. | | |
| 2005/0169443 A1 | 8/2005 | Rosenthal | | |
| 2006/0063541 A1* | 3/2006 | Ryu | ........... | 455/466 |
| 2006/0069664 A1* | 3/2006 | Ling et al. | ........... | 707/1 |
| 2006/0284893 A1* | 12/2006 | Hlad et al. | ........... | 345/684 |
| 2007/0191038 A1* | 8/2007 | Kim et al. | ........... | 455/466 |
| 2007/0293266 A1* | 12/2007 | Lu et al. | ........... | 455/557 |

OTHER PUBLICATIONS

Internet Document: "Info Sharp Introduction", Shareware Product Description at http://www.mycnknow.com/infosharp.htm (accessed Jun. 23, 2006).

\* cited by examiner

*Primary Examiner* — Kent Chang
*Assistant Examiner* — Marcus Hammonds

(57) ABSTRACT

A wireless handset is configured to send and receive messages and comprises a handset memory, a first user interface, a second user interface and a processor. A method to send and receive messages is disclosed. The method comprises storing a plurality of messages on the wireless handset, and receiving instructions that select at least two of the plurality of messages that have been stored on the wireless handset. The method then proceeds to identify a phone number associated with a particular recipient, and sends each of the selected plurality of messages stored on the wireless handset to the identified phone number associated with the particular recipient.

9 Claims, 7 Drawing Sheets

WIRELESS HANDSET CONFIGURED TO FORWARD MULTIPLE MESSAGES

FIELD OF THE INVENTION

This invention relates to an apparatus such as a wireless handset that is configured to forward multiple messages. More particularly, the invention relates to using a software module on a wireless handset that is configured to forward multiple messages to one or more contacts.

BACKGROUND OF THE INVENTION

Wireless handsets are commonly used to receive and forward messages. There are a variety of different messages services. For example, Short Message Service (SMS) is a service available on most digital mobile phones that permits sending short messages, also known as text messages, between mobile phones, handheld devices, and even landline phones. SMS messages are sent via a store-and-forward mechanism to a Short Message Service Center (SMSC) which will attempt to send the message to the recipient. If the user is not reachable at a given moment, the SMSC will save the message. Later when the user is reachable the SMSC will again attempt to deliver the message. Both Mobile Terminated (MT) and Mobile Originated (MO) operations are supported.

Another messaging service is referred to as Enhanced Messaging Service (EMS). EMS is an application-level extension to SMS for mobile phones available on GSM, TDMA, and CDMA networks. An EMS enabled mobile phone can send and receive messages that have special text formatting (such as bold or italic), animations, pictures, icons, sound effect and special ring tones. EMS messages that are sent to devices that do not support EMS will be displayed as SMS transmissions.

Multimedia Messaging Service (MMS) is an evolutionary extension of SMS, and is a standard that allows sending messages that include multimedia objects (images, audio, video, rich text, etc.). The initial submission by an MMS client to the home MMS Center (MMSC) is accomplished using HTTP with specialized commands and encodings, which are defined by the Open Mobile Alliance.

After a message is received in the Inbox of the recipient's wireless handset, the recipient has the option to forward the message. Forwarding the received message is performed by selecting the single message and then forwarding the message to another recipient. When there a multiple messages to forward to one or more recipients, the process of forwarding each message is time consuming and frustrating because when forwarding the messages, the user must navigate a variety of different screens for each message that is being sent.

Additionally, there are different types of pricing plans associated with the sending and receiving of messages. For example, some pricing plans for mobile phone subscribers permit the user to send and receive messages at little or no cost. Mobile subscribers that subscribe to these no-cost messaging plans, rely on messages rather than voice calls. Nevertheless, the ability to forward multiple messages is burdensome because the process of forwarding multiple messages consumes so much time.

SUMMARY

A wireless handset configured to send and receive messages is described. The wireless handset comprises a handset memory, a first user interface, a second user interface and a processor. The handset memory stores a plurality of messages. The first user interface that is configured to receive a first set of instructions that selects at least two messages stored on the handset memory. The second user interface receives a second set of instructions that identifies at least one phone number associated with at least one recipient. The processor is in operative communications with the handset memory and processes the first set of instructions that selects at least two messages, and processes the second set of instructions that identifies the recipient.

In an alternative embodiment, a means for receiving the first set of instructions and a means for receiving the second set of instructions is also described. The first set of instructions selects at least two of the plurality of messages stored on the handset memory. The second set of instructions identifies at least one phone number is associated with at least one recipient.

A method for forwarding multiple messages from a wireless handset is also described. The method comprises storing a plurality of messages on the wireless handset, and receiving instructions that select at least two of the messages that have been stored on the wireless handset. The method then proceeds to identify a phone number associated with a particular recipient, and sends each of the selected messages stored on the wireless handset to the identified phone number associated with the particular recipient.

DRAWINGS

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the method may vary as to details, order of the actions, or other variations without departing from the illustrative method disclosed herein.

A software module for forwarding multiple messages from a wireless handset is described herein. By way of example and not of limitation, the messages include SMS, EMS, MMS and other such messages. The solution described provides a simplified approach for forwarding these messages efficiently. Additionally, the software module for forwarding messages permits a user to maximize the benefits associated with the user's subscription plan with a service provider. The software module may be pre-loaded on to a wireless handset and may be one of the features loaded on to the wireless handset. The software module for forwarding messages can also be downloaded to the wireless handset and can be one of the features on the wireless handset.

Figure 1:
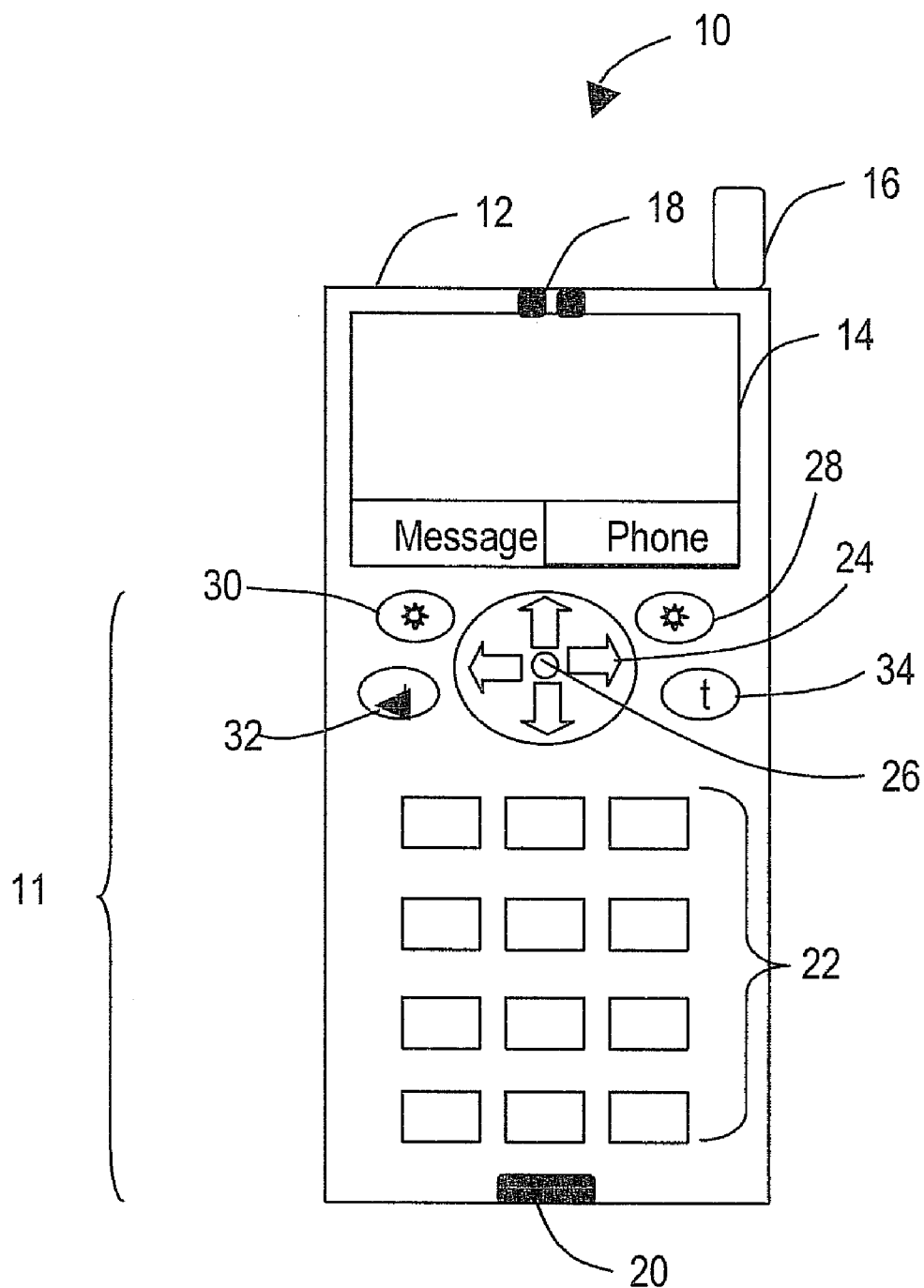
FIG. 1 shows an illustrative wireless handset that allows multiple messages to be forwarded to one or more recipients.

Referring to FIG. 1, there is shown an illustrative wireless communication device 10 that allows multiple messages to be forwarded to one or more recipients. By way of example and not of limitation, the wireless handset 10 is a wireless communications device such as a portable cell phone, mobile handset, mobile phone, wireless phone, cellular phone, portable phone, a personal digital assistant (PDA), Blackberry, smart telephones, or any type of personal mobile terminals which are regularly carried by a user having all the elements necessary for operation in a wireless communication system, such as CDMA, GSM, UMTS, WLAN, WiMAX or any other wireless communication system. The mobile phone 10 may be built as a light weight and small size device adapted to be easily and conveniently carried around by a user on a regular basis.

The mobile phone 10 is further adapted for user operation and includes a front body 12, a display 14, an antenna 16, speaker 18, microphone 20, and an input interface 11 that has a number of push buttons enabling a user to manually input data and/or instructions to the mobile phone 10. The input interface 11 includes, for example, a normal soft key pad 22, such as key pad for the mobile phone 10 or a PDA, and may additionally include specific input keys, such as a navigation key 24 that permits the user to travel up, down, left, right, and center key, which may act in a manner similar to an enter key. Additionally, the input interface 11 has soft keys such as a phone soft key 28 and a message soft key 30. The function of each soft key button is identified by the MESSAGE box and the PHONE box on the display 14. The input interface 11 also includes a separate enter button 32 and a termination button 34. Display 14 may also be configured so that users may access and see information such as type of service, data rate, talk time, and signal strength. In operation, after a message is received and stored on the illustrative wireless handset 10, the illustrative user decides to access the stored messages by pressing the message soft key 30.

In one illustrative embodiment, the user interface described herein comprises the display 14 and the input interface 11. The user interface provides a means for a user to provide input and view the output, and permits the user to interact with the wireless handset 10. Since the input interface may include soft keys that change with the function shown on the display, there are a variety of different user interfaces that result in a corresponding variety of screen shots as described below.

In the illustrative wireless handset 10, a plurality of messages are received and stored on the wireless handset 10. The input interface 11 receives a first set of instructions that selects at least two of the plurality of messages stored on the wireless handset 10. The display 14 permits the user to view the plurality of messages and the selected messages at the same time, and further detail is provided below. The input interface 11 is also configured to receive a second set of instructions that identifies at least one phone number associated with one or more recipients. The messages that have been selected are sent to the identified recipient or recipients. During the process of sending the message, the termination button 34 may be actuated that terminates sending the selected messages before all the selected messages have been sent.

Figure 2:
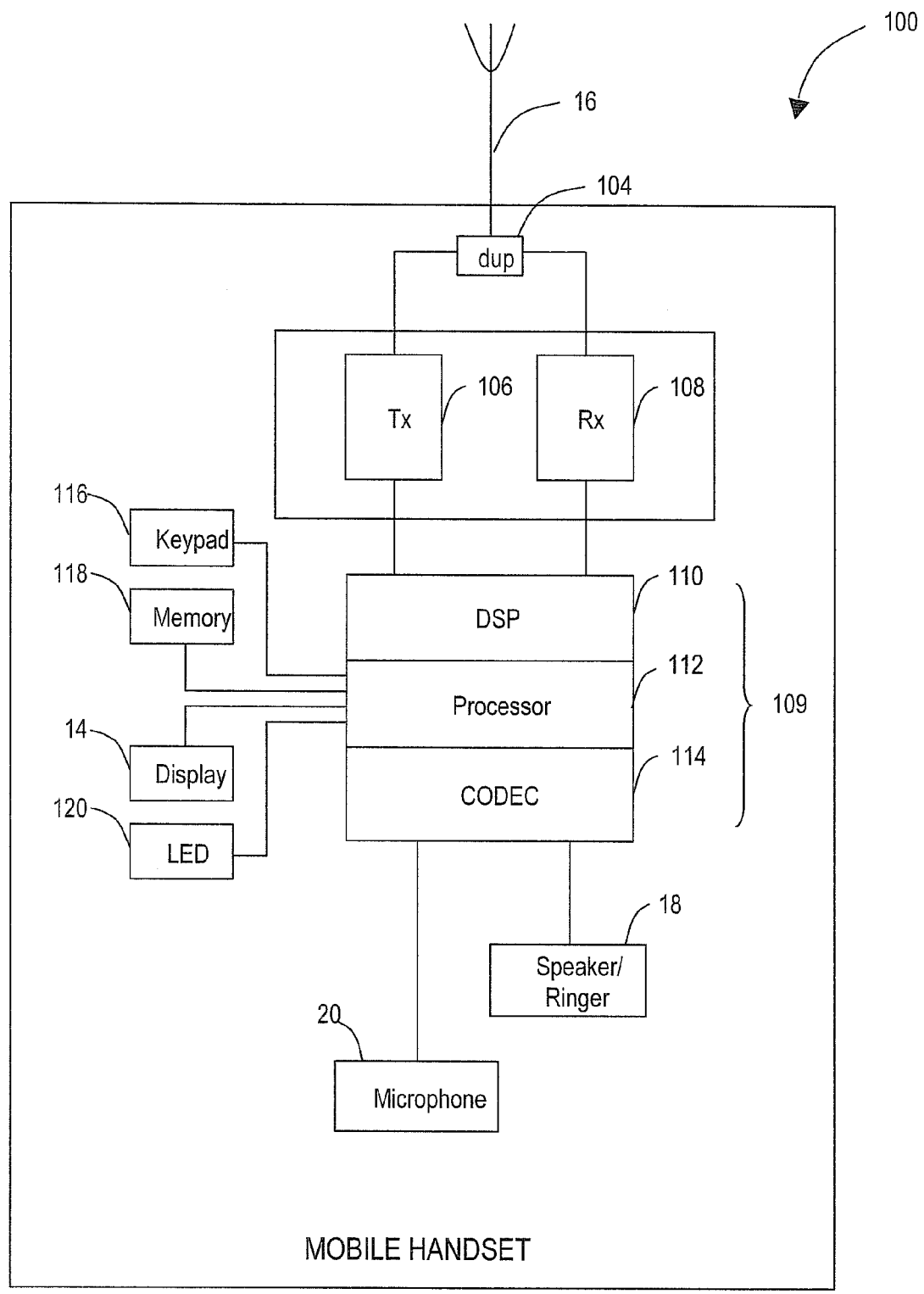
FIG. 2 shows an illustrative block diagram of the wireless handset described in FIG. 1.

Referring to FIG. 2 there is shown a block diagram of the internal components associated with the wireless handset 10 described above. An illustrative block diagram 100 of the internal components of the wireless handset 10 comprises the antenna 16 that is operatively coupled to a duplexer 104, which is operatively coupled to transmitter 106 and receiver 108. An illustrative control module 109 comprises a digital signal processor (DSP) 110, a processor 112, and a codec 114 that are communicatively coupled to the transmitter 104 and receiver 108. The DSP 110 may be configured to perform a variety of operations such as controlling the antenna 16, transmitter 106, and receiver 108 operations.

The processor 112 is operatively coupled to a keypad 116, a memory 118, a display 14, and at least one set of LED lights 120. The processor 112 is also operatively coupled to a codec module 114 that performs the encoding and decoding operations and is communicative coupled to the speaker or ringer 18, and a microphone 20.

The memory module 118 is configured to store a plurality of messages received by the wireless handset 10 such as SMS, EMS, MMS and other similar messages. Additionally, the memory module 118 can be used to store input data or store programming instructions that have been downloaded to the wireless handset 10 or previously programmed in the wireless handset 10. Thus, the software module described may be pre-loaded to handset 100 or may be downloaded from a network system (not shown). The processor 112 is configured to process the plurality of computer instructions associated with the software module described herein.

The illustrative processor 112 is in operative communications with the handset memory 118. The processor 112 processes a first set of instructions that selects at least two messages from a list of messages that are shown on display 14. The first set of instructions is received from a first user interface. Additionally, the processor 112 processes a second set of instructions that identifies one or more recipients that will be receiving the plurality of messages. Again the second set of instructions is received from a second user interface. The processor then sends the plurality of selected messages to the recipient or recipients.

In the illustrative embodiment, the processor 112 is configured to send the plurality of messages in a serial manner, so that messages are sent one at a time. This approach optimizes the use of current mobile handset resources. Additionally, when a voice call is mobile initiated or mobile terminated, the processor 112 is configured to pause sending the plurality of selected messages. Thus, if a voice call is sent or received, then the processor 112 is configured to pause sending the messages. However, when the voice call is completed, the processor 112 is configured to continue sending the plurality of selected messages when the voice call is completed. Additionally, a termination instruction may be received after the termination button 34 is depressed. The termination instruction that is communicated to the processor 112 terminates the sending of the messages so that all the selected messages are not sent.

The illustrative first user interface and second user interface comprise the display 14 and the input interface 11, which includes soft keys, specific input keys, and navigation keys. Alternatively, a touch screen wireless handset may also be utilized in which the input interface 11 is a touch screen display where the display and input interface are functionally combined. Thus, the touch screen display is both the input interface and the display. By way of example and not of limitation, a touch screen wireless handset may be a WiFi enabled PDA device. The illustrative touch screen wireless handset provides a means for receiving a first set of instructions that selects at least two of the plurality of messages stored on the wireless handset memory. The means for receiving the first set of instruction is configured to permit viewing the plurality of messages and the selected messages at the same time on a handset display. Additionally, the illustrative touch screen wireless handset provides a means for receiving a second set of instructions that identifies at least one phone number associated with at least one recipient.

It shall be appreciated by those skilled in the art having the benefit of this disclosure that the first set of instructions associated with selecting the multiple messages and the second set of instructions that identifies the recipients for the multiple messages can also be communicated using voice command instructions that are spoken to the wireless handset. Additionally, another wired or wireless device may be in operative communication with the wireless handset 10 and provide the first set and second set of instructions. Thus, various means for receiving the first set of instructions and means for receiving the second set of instructions can be used depending on engineering requirements and specifications.

Figure 3A:
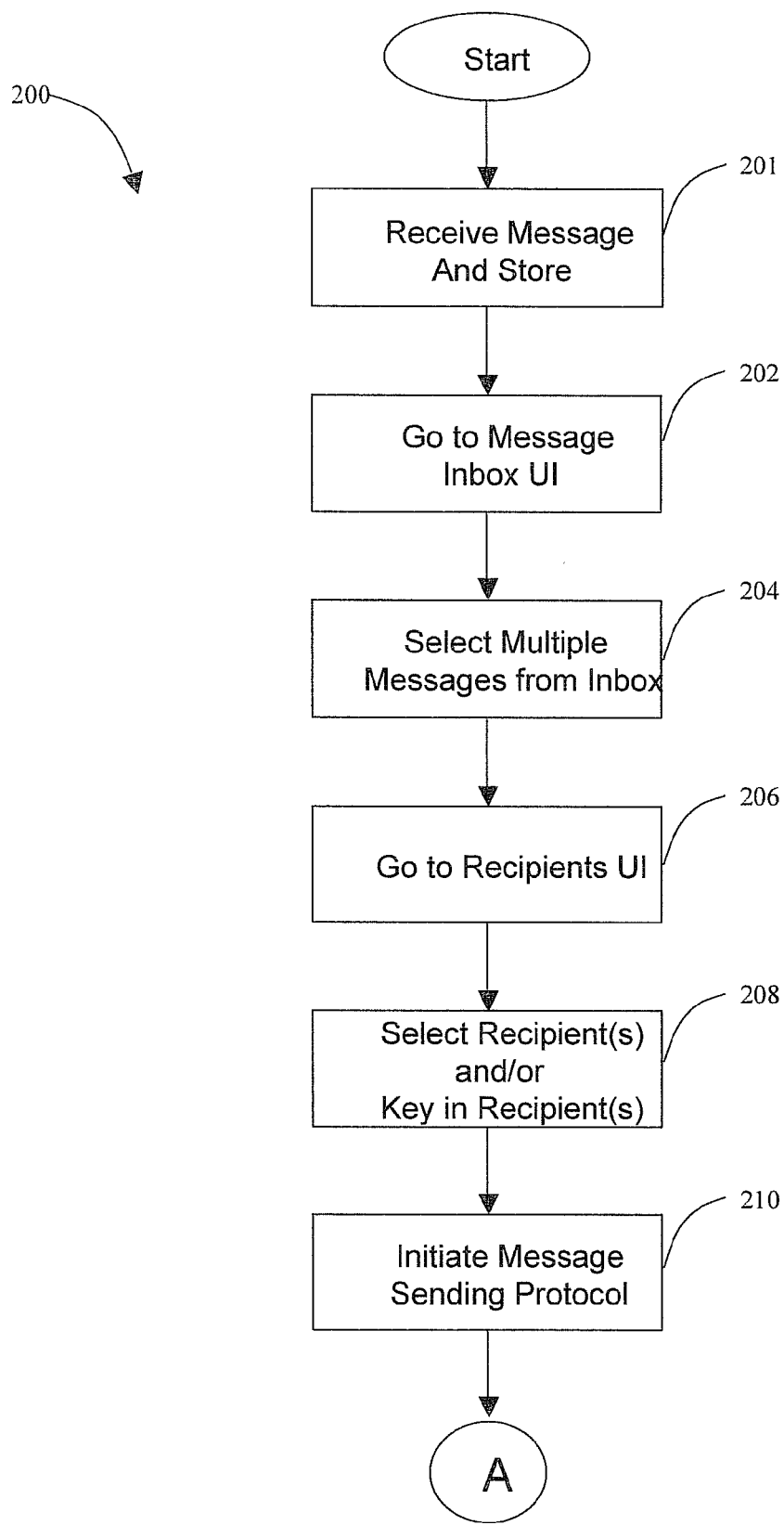
FIG. 3A shows an illustrative flowchart that permits a user to forward multiple messages from the first wireless handset.
Figure 3B:
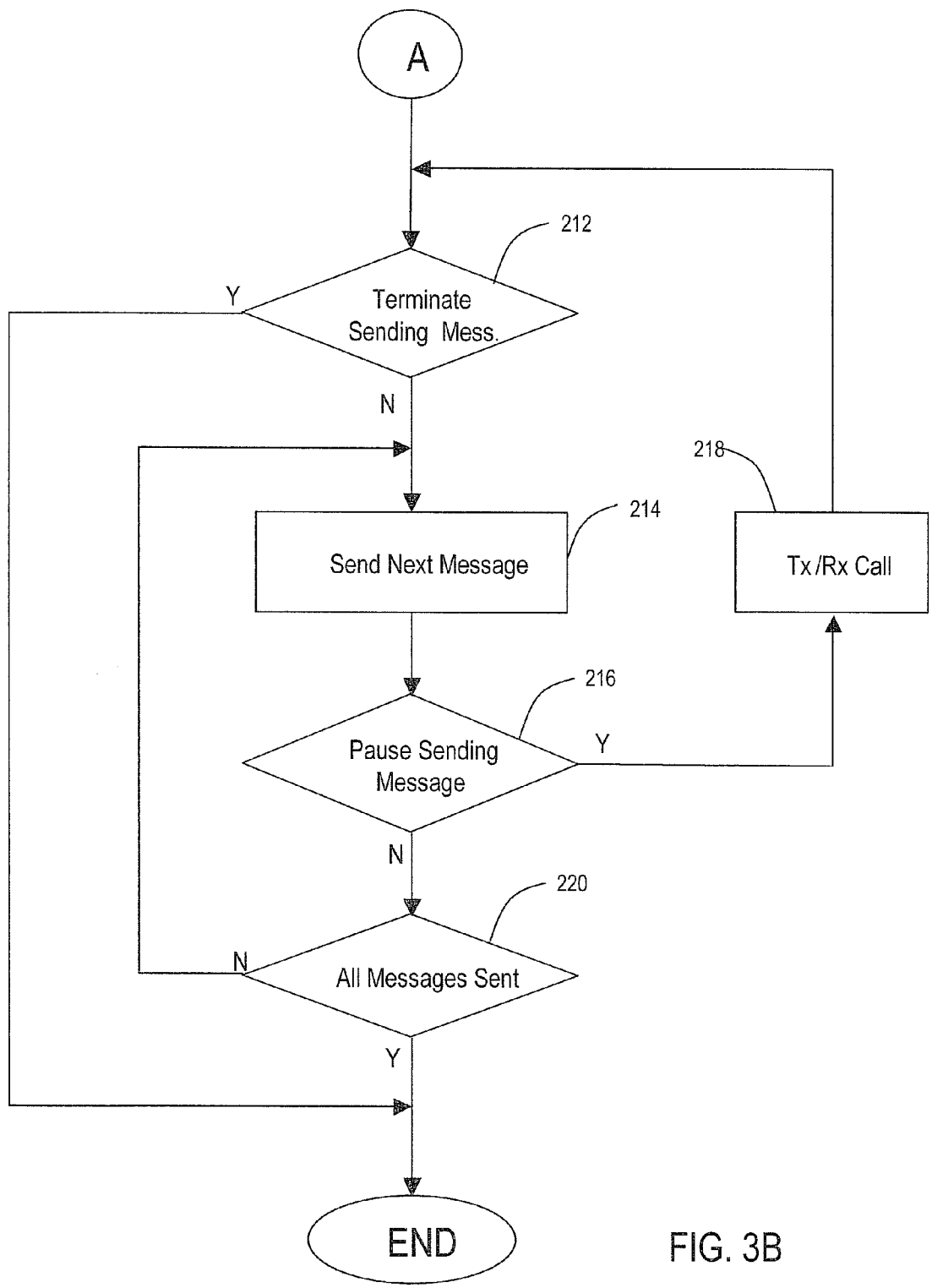
FIG. 3B shows a continuing illustrative flowchart that was initiated by FIG. 3A.

Referring to FIGS. 3A and 3B there is shown an illustrative flowchart that permits a user to forward multiple messages from the wireless handset 10. The illustrative flowchart shows the process flow for a software module that forwards multiple messages from the wireless handset 10. The messages include SMS, EMS, MMS and other such messages. The method is initiated at block 201 where messages are received by the illustrative wireless handset 10 and are stored thereon in memory 118. As described herein the messages may be SMS, EMS, MMS or any other such messages. The user then has the option to forward a plurality of messages to a plurality of recipients from the user's wireless handset 10.

To forward the messages, the user accesses the Inbox shown in block 202. By way of example and not of limitation, the user interface for the Inbox comprises the input interface 11 and the display 14 that is configured to permit viewing the plurality of messages on the display 14. Using the input interface 11, the user selects at least two of the stored messages for sending as shown in block 204. In the illustrative embodiment, the selection process is performed by "clicking" or identifying the messages to forward from a single window. The wireless handset 10 receives and processes the instructions associated with selecting the messages at the same time.

At block 206 the user then proceeds to access the recipient user interface, which permits the user to identify phone numbers associated with recipients. As represented by block 208, the user selects a recipient by accessing a Contacts list or by inputting the phone number of the recipient. Additionally, a plurality of phone numbers associated with a plurality of recipients may also be provided to the recipient user interface. By way of example and not of limitation, the recipient user interface comprises the input interface 11 and display 14. The user interface may be embodied as voice commands, a touch screen, an input interface, a display, or any combination thereof that is configured to provide a means for interacting with a user.

The method then proceeds to block 210 where the message sending protocol is initiated. The message sending protocol sends each of the selected plurality of messages stored on the wireless handset to the identified phone number associated with the one or more recipients. In the illustrative method, the messages are sent in a serial manner, i.e. one-at-a-time. Thus, a batch of messages is selected in the Inbox UI and from the recipient UI, and this batch of message is sent one message at a time from the wireless handset 10 to each recipient.

At decision diamond 212, the determination is made to terminate forwarding the multiple messages. The decision may be made before the first message is forward, or while the messages are being forwarded, or when the sending of messages has been paused. The termination of forward messages can be performed with a soft key, or by selecting a displayed action, or by actuating a key on the keypad input interface 11, or by providing a voice command, or any other such means for terminating sending the plurality of messages. If the decision is made to terminate sending messages, then the sending of messages ceases.

However, if the decision is made to continue sending messages, then the method proceeds to block 214 where the selected messages are sent to a particular recipient. In the illustrative embodiment, each message is sent individually. During the sending of a particular message, the process of sending messages may be paused as shown in decision diamond 216 when a voice call is initiated. The voice call may be mobile originated or mobile terminated as represented by block 218 which shows a voice call being transmitted or received. After the voice call in block 218 is completed, the method returns to decision diamond 212 where it is determined whether to terminate sending the messages. If the user decides no to terminate the messages, then the method continues sending selected message as described by block 214. Those skilled in the art shall appreciated that after the voice call is terminated, the method may continue sending the remaining elements of the interrupted message to the intended recipient, and the method then proceeds to select the next message in the queue and send this next message as represented by block 214.

However, if a voice call is not initiated, the method proceeds to decision diamond 220 where it is determined whether all the selected messages had been sent to the selected and/or identified recipients. If all the messages have not been sent, then the method returns to block 214 and the next message is sent. However, if all the messages have been sent, then the message sending process ends.

Figure 4A:
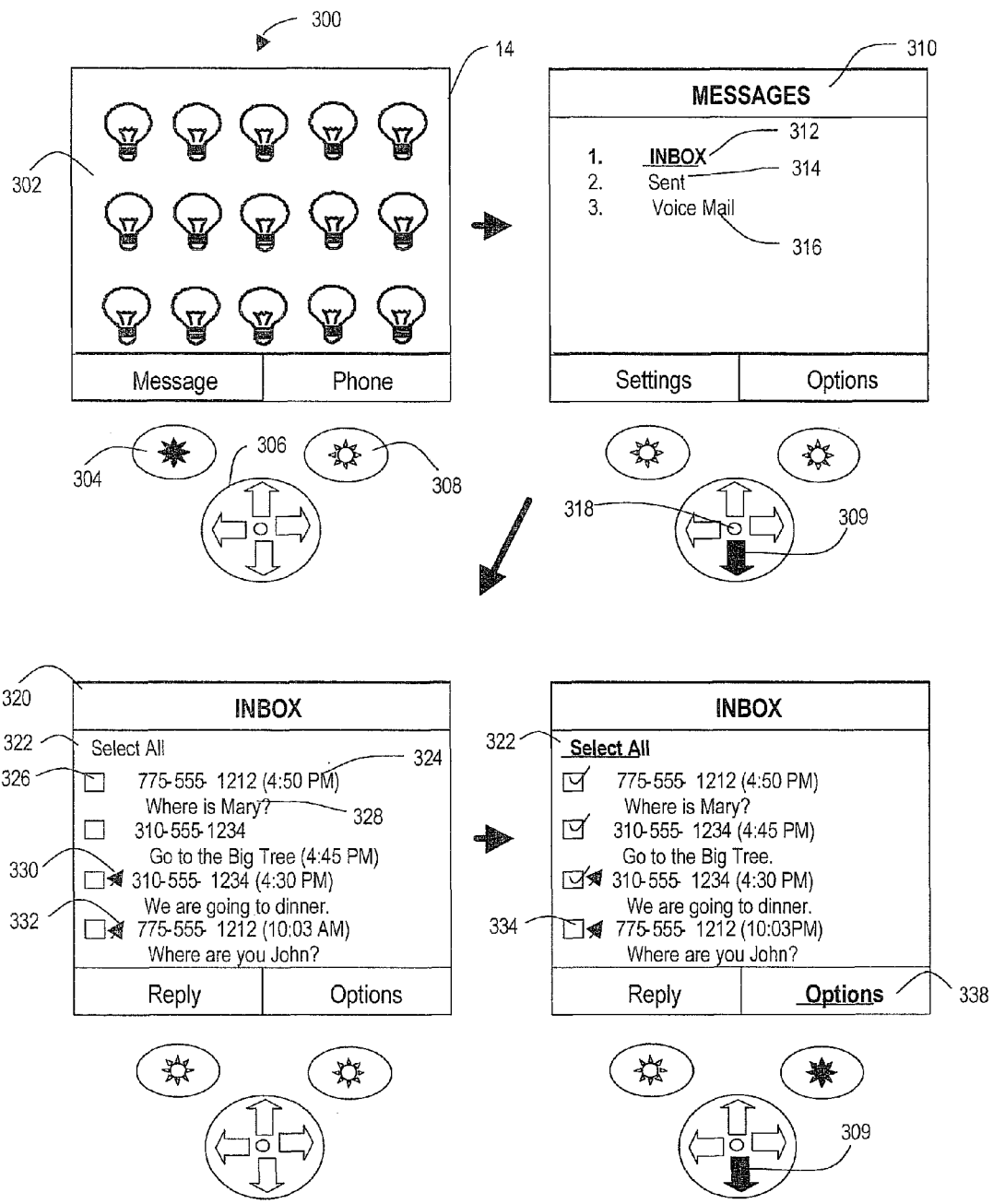
FIG. 4A-FIG. 4C show a plurality of screenshots on the display of wireless handset that show a user forwarding multiple messages from the wireless handset.
Figure 4B:
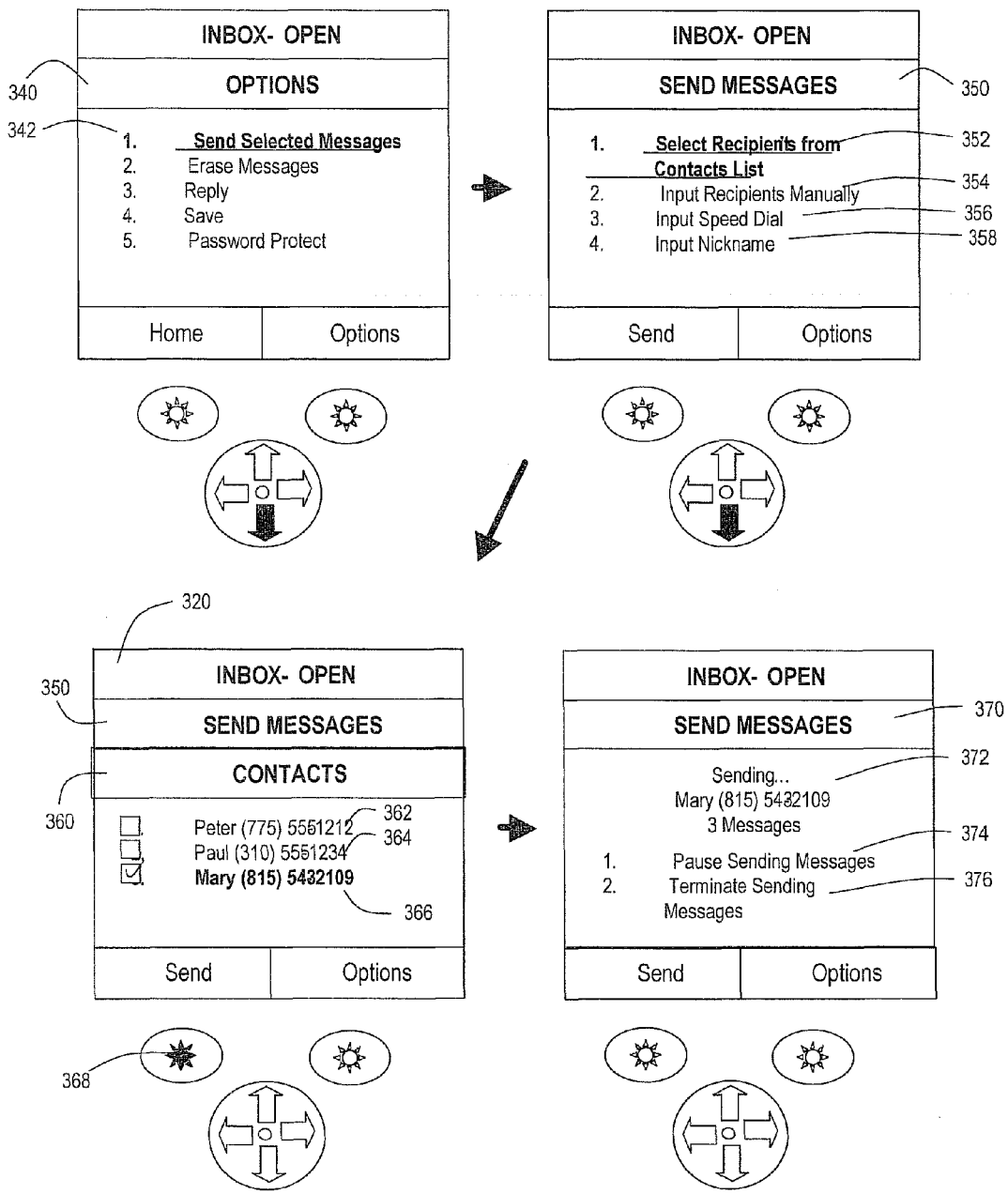

Referring to FIG. 4A and FIG. 4B there is shown a plurality of screenshots on the illustrative display 14 of an illustrative wireless handset 10 that shows a user forwarding multiple messages from the wireless handset. The screenshots are visible on a display 14 and reflect instructions received from the illustrative keypad 116, the illustrative input interface 11 having soft button keys, a navigation button, a scroll key, voice commands or any other such input means. The first screen shot 300 shows the handset in an operative mode that permits the user to access messages, and a phone function. The wallpaper 302 is on the display 14, a message soft key 304, a navigation key 306 and a phone soft key 308 is shown. A soft key is a button located along a display device, which performs the function shown near it on the display. In the first screen shot 300, the message soft key 306 is actuated and this activation of the soft key is represented by the filled star on soft key 304.

After pressing the message soft key 304, the next screen shot is identified as the MESSAGES 310 screen heading. The MESSAGES screenshot 310 comprises an Inbox 312 folder, a Sent 314 folder, and a Voice Mail 316 folder. By depressing the down button 309 on the navigation key 306, the user is able to scroll through the various folders. In the illustrative example, the user presses the down button 309 and gets to the highlighted Inbox 312 folder. The user then proceeds to press an enter button such as enter button 32 described in FIG. 1. Alternatively, the enter button 318 may be at the center of the navigation key 306.

After actuating the enter button, the next screen shot has the INBOX 320 screen heading. The INBOX 320 screen includes a Select All action that permits a user to select all the messages in the INBOX 320. In the illustrative example, each message includes an illustrative phone number and time field 324, a check box 326 that identifies whether the message has been selected, a message field 328 that displays a portion of the message. If the user of the handset has replied to the message, then an arrow 330 and 332 indicates that a response has been sent.

At the illustrative INBOX 320 screen the user may then decide to scroll to the "select all" link using the down button 309, and then proceeds to press enter, which would check all the boxes on the screen 320. The illustrative user then decides to deselect box 334 so that the message associated with box 334 is not chosen. Again the navigation key 309 and the enter key may be used in combination to deselect the message associated with box 334. The illustrative user then continues by depressing the options 338 soft key, which takes the user to the illustrative OPTIONS 340 screen shown in FIG. 4B.

At the OPTIONS 340 screen, the user decides to enable the Send Selected Messages operation 342. Again a combination of the down arrow and the enter button can be used to enable this operation, which then takes the user to the SEND MESSAGES 350 screen. A variety of operations may then be enabled such as a Select Recipients from Contacts List operation 352, an Input Recipients Manually operation 354, an Input Speed Dial operation 356, or an Input Nickname operation 358. In the illustrative SEND MESSAGES 350 screen, the user has chosen the Select Recipient's from Contacts List operation 352, which takes the user to the CONTACTS screen 360.

At the CONTACTS screen 360 the user has three contacts to pick from that have identified the contact name and the contact phone number. The first contact is Peter 362, the second contact is Paul 364, and the third contact is Mary 366. In the illustrative embodiment, the user selects the Mary 366 contact and presses the Send soft key 368 or uses the navigational key to select Mary 366 by checking the associated box. Additionally, the illustrative user has the option of selecting other recipients to send the selected messages too. For example, the multiple recipients selected by the user may include a plurality of contacts from the contact list, or other recipients that are identified via manual input. After the user selects at least one recipient, the user goes to the SEND MESSAGES 370 screen.

The SEND MESSAGES 370 screen displays that the text 372, which indicates that 3 messages are being sent to Mary's phone number. Within the SEND MESSAGES 370 screen there are two operations that can be enabled, namely, the Pause sending Messages operation 374, and the Terminate Sending Messages operation 376. The Pause Sending Message operation 374 lets the user pause sending the messages manually, instead of having to make a mobile originated phone call, which would also pause sending the messages. The Terminate Sending Messages operation 376 allows the user to use the navigate button 306 and enter key to terminate sending the batch of messages that were or are being sent.

Figure 4C:
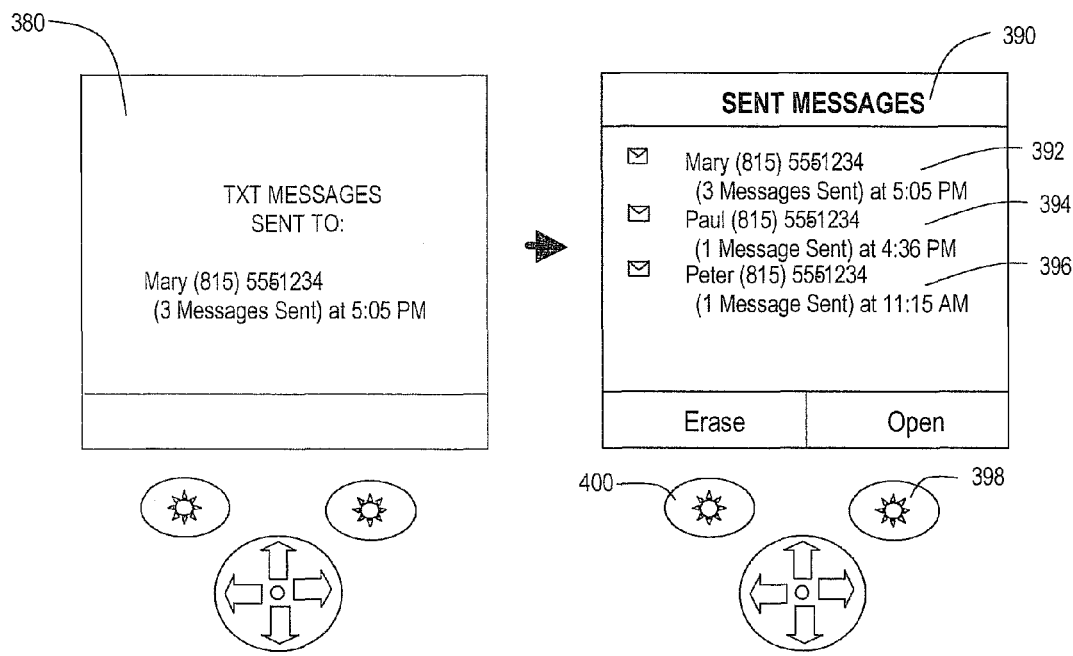

After all the messages to Mary have been sent the next screen shot is seen in FIG. 4C which shows 380, which indicates that three text messages have been sent to Mary's phone number, and the time that the messages were sent. After the messages are sent, the user may be return to the MESSAGES screen 310 and access the Sent 314 folder. The Sent 314 folder takes the user to the SENT MESSAGES 390 screen, and displays the messages that have been sent from the wireless handset. In particular, the user then has an opportunity to view the sent messages to Mary 392, Paul 394, and Peter 396. At the SENT MESSAGES 390 screen the user also has the option to actuate the OPEN soft key 398 or the ERASE 400 soft key on the handset. The OPEN soft key 398 lets the user identify the group of messages that have been sent to one or more recipients. And the ERASE 400 soft key lets the user erase the sent messages.

Illustrative hardware and software for forwarding multiple messages form a wireless handset have been described. The messages include SMS, EMS, MMS and other such messages. The solution provides an efficient and simplified approach for forwarding these messages. The software module for forwarding messages permits a user to maximize the benefits associated with the user's subscription plan with a service provider. For example, a user having a subscription plan with free messaging would be highly motivated to forward multiple messages in a simple and efficient manner.

It is to be understood that the foregoing is a detailed description of illustrative embodiments. The scope of the claims is not limited to these specific embodiments or examples. For example, a wireless handset 10 is described, however this solution may be extended to any wireless handset that can communicate messages. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless handset configured to send and receive messages, the wireless handset comprising:
   a handset memory configured to store a plurality of messages;
   a first user interface that is configured to receive a first set of instructions that selects at least two of the plurality of messages stored on the handset memory, the first user interface displaying a plurality of messages in a single window;
   a second user interface that is configured to receive a second set of instructions that identifies a plurality of phone numbers, each phone number associated with at least one recipient, the second user interface displaying a plurality of phone numbers in a single window; and
   a third user interface that is configured to display a number of messages being sent to at least one recipient and a phone number associated with the at least one recipient, the third user interface configured to receive a termination instruction;
   a processor in operative communications with the handset memory, the processor configured to:
   process the first set of instructions that selects at least two messages;
   process the second set of instructions that identifies the plurality of phone numbers;
   send the plurality of messages in a serial manner;
   pause sending the plurality of selected messages when a voice call is initiated;
   continue sending the plurality of selected messages when the voice call is completed;
   process a termination instruction that terminates sending the selected messages before all the selected messages have been sent, wherein the termination instruction may be received when the sending of the plurality of selected messages is paused when a voice call is initiated.

2. The wireless handset of claim 1 wherein said processor is configured to send the plurality of selected messages to the at least one recipient.

3. The wireless handset of claim 2 wherein said first user interface is configured to permit viewing the plurality of messages and the selected messages at the same time on a handset display.

4. A wireless handset configured to send and receive messages, the wireless handset comprising:
- a handset memory configured to store a plurality of messages;
- a means for receiving a first set of instructions that selects at least two of the plurality of messages stored on the handset memory, the means for receiving a first set of instructions displaying a plurality of messages in a single window;
- a means for receiving a second set of instructions that identifies a plurality of phone numbers, each phone number associated with at least one recipient, the means for receiving a second set of instructions displaying a plurality of phone numbers in a single window;
- a means for receiving a third set of instructions that displays a number of messages being sent to at least one recipient and a phone number associated with the at least one recipient, the means for receiving a third set of instructions further configured to receive a termination instruction; and
- a processor in operative communications with the handset memory, the processor configured to;
    - process the first set of instructions that selects at least two messages;
    - process the second set of instructions that identifies the plurality of phone numbers;
    - send the plurality of messages in a serial manner;
    - pause sending the plurality of selected messages when a voice call is initiated;
    - continue sending the plurality of selected messages when the voice call is completed; and
    - process a termination instruction that terminates sending the selected messages before all the selected messages have been sent, wherein the termination instruction may be received when the sending of the plurality of selected messages is paused when a voice call is initiated.

5. The wireless handset of claim 4 wherein said processor is configured to send the plurality of selected messages to the at least one recipient.

6. The wireless handset of claim 5 wherein said means for receiving the first set of instruction is configured to permit viewing the plurality of messages and the selected messages at the same time on a handset display.

7. A method for forwarding multiple messages from a wireless handset, the method comprising:
- storing a plurality of messages on the wireless handset;
- receiving instructions that select at least two of the plurality of messages that have been stored on the wireless handset from a user interface displaying a plurality of messages in a single window;
- identifying a plurality of phone numbers, each phone number associated with a particular recipient from a user interface displaying a plurality of phone numbers in a single window;
- displaying a number of messages being sent to at least one recipient and a phone number associated with the at least one recipient;
- sending each of the selected plurality of messages stored on the wireless handset to the identified phone numbers associated with the particular recipients, wherein the selected plurality of messages are sent serially;
- pausing the sending of the selected plurality of messages when a voice call is initiated;
- continuing sending the selected plurality of messages after the voice call is completed; and
- when a termination instruction is received, terminating sending of the selected messages before all the selected messages have been sent, wherein the termination instruction may be received when the sending of the plurality of selected messages is paused when a voice call is initiated.

8. The method of claim 7 further comprising providing a user interface configured to permit viewing the plurality of messages and receiving instructions that select at least two of the plurality of messages at the same time on a wireless handset display.

9. The method of claim 7 further comprising identifying a plurality of phone numbers associated with a plurality of recipients.

* * * * *